(12) United States Patent
Huffer

(10) Patent No.: US 12,179,463 B2
(45) Date of Patent: Dec. 31, 2024

(54) RECYCLABLE PAPER WITH POLYMERIC BARRIER LAYER AND METHOD OF RECYCLING THE SAME

(71) Applicant: Sonoco Development, Inc., Hartsville, SC (US)

(72) Inventor: Scott William Huffer, Hartsville, SC (US)

(73) Assignee: Sonoco Development, Inc., Hartsville, SC (US)

(*) Notice: Subject to any disclaimer, the term of this patent is extended or adjusted under 35 U.S.C. 154(b) by 183 days.

(21) Appl. No.: 17/723,728

(22) Filed: Apr. 19, 2022

(65) Prior Publication Data
US 2023/0330979 A1 Oct. 19, 2023

(51) Int. Cl.
| | |
|---|---|
| *B32B 29/00* | (2006.01) |
| *B32B 7/12* | (2006.01) |
| *B32B 15/08* | (2006.01) |
| *B32B 27/30* | (2006.01) |

(52) U.S. Cl.
CPC .......... *B32B 29/002* (2013.01); *B32B 7/12* (2013.01); *B32B 15/08* (2013.01); *B32B 27/308* (2013.01); *B32B 2250/03* (2013.01); *B32B 2255/26* (2013.01); *B32B 2307/31* (2013.01); *B32B 2307/718* (2013.01)

(58) Field of Classification Search
None
See application file for complete search history.

(56) References Cited

U.S. PATENT DOCUMENTS

| | | | |
|---|---|---|---|
| 5,506,036 | A | 4/1996 | Bergerioux |
| 6,960,374 | B1 | 11/2005 | Terada et al. |
| 7,294,400 | B2 | 11/2007 | Byb et al. |
| 7,717,620 | B2 | 5/2010 | Hebert et al. |
| 7,943,218 | B2 | 5/2011 | Knoerzer et al. |
| 8,083,064 | B2 | 12/2011 | Boswell et al. |
| 8,513,144 | B2 | 8/2013 | Ting et al. |
| 8,597,733 | B2 | 12/2013 | Vondelden |

(Continued)

FOREIGN PATENT DOCUMENTS

| | | |
|---|---|---|
| AT | 522884 B1 | 3/2021 |
| EP | 0656442 B1 | 8/1999 |

(Continued)

OTHER PUBLICATIONS

Grefenstein, A., Recyclable Paper Packaging, Aug. 26, 2021, machine translation of WO2021/164913 (Year: 2021).*

(Continued)

*Primary Examiner* — Chinessa T. Golden
(74) *Attorney, Agent, or Firm* — Nelson Mullins Riley & Scarborough LLP

(57) ABSTRACT

A recyclable structure and methods of recycling are provided herein. A recyclable structure for use in packaging comprises a paper layer, and a polymeric film layer. An adhesive layer adhesively joins the paper layer and the polymeric layer. The adhesive layer comprises an acrylic or a urethane adhesive. The recyclable structure 85% by subjecting the structure to mechanical stresses and repulping. The adhesive layer has a greater affinity for the polymeric film layer than the paper layer. Upon repulping the adhesive layer is mostly separated from the fibers within the paper layer.

18 Claims, 3 Drawing Sheets

(56) References Cited

U.S. PATENT DOCUMENTS

| | | | |
|---|---|---|---|
| 8,871,319 | B2 | 10/2014 | Stanley et al. |
| 9,102,125 | B2 | 8/2015 | Battersby et al. |
| 11,072,148 | B2 | 7/2021 | Yializis et al. |
| 11,548,709 | B1 | 1/2023 | Myer et al. |
| 11,597,191 | B2 | 3/2023 | Bartolucci et al. |
| 2016/0237626 | A1 | 8/2016 | Anderson et al. |
| 2017/0246836 | A1 | 8/2017 | Giusti et al. |
| 2018/0201814 | A1* | 7/2018 | Harada ............... B32B 9/025 |
| 2019/0291134 | A1 | 9/2019 | Mongrain |
| 2020/0370244 | A1 | 11/2020 | Becker et al. |
| 2021/0188514 | A1 | 6/2021 | Beer |
| 2021/0237409 | A1 | 8/2021 | Ostergren |
| 2022/0033158 | A1 | 2/2022 | Boswell et al. |
| 2022/0112663 | A1 | 4/2022 | Boswell et al. |
| 2022/0134719 | A1 | 5/2022 | Beer |
| 2022/0242639 | A1 | 8/2022 | Meyer et al. |
| 2022/0243067 | A1 | 8/2022 | Leivo et al. |
| 2023/0092087 | A1 | 3/2023 | Schumacher et al. |
| 2023/0114239 | A1 | 4/2023 | Grefenstein et al. |

FOREIGN PATENT DOCUMENTS

| | | | | |
|---|---|---|---|---|
| EP | 2257430 | B1 | 1/2013 | |
| WO | WO-2011089015 | A2 * | 7/2011 | ............. B31F 1/007 |
| WO | 2013086950 | A1 | 6/2013 | |
| WO | 2016207918 | A1 | 12/2016 | |
| WO | 2020112148 | A1 | 6/2020 | |
| WO | 2020170226 | A1 | 8/2020 | |
| WO | WO-2021164913 | A1 * | 8/2021 | ........... B32B 15/085 |
| WO | 2022027047 | A1 | 2/2022 | |
| WO | 2022074421 | A1 | 4/2022 | |
| WO | 2022093544 | A1 | 5/2022 | |
| WO | 2022165417 | A1 | 8/2022 | |
| WO | 2022243066 | A1 | 11/2022 | |

OTHER PUBLICATIONS

Fibre Box Association (FBA); "Voluntary Standard For Repulping and Recycling Corrugated Fiberboard Treated to Improve its Performance in the Presence of Water and Water Vapor," 23 pages, revised Aug. 16, 2013.

Kaiser et al.; "Recycling of Polymer-Based Multilayer Packaging: A Review"; Published Dec. 22, 2017; downloaded Apr. 18, 2022 from https://www.mdpi.com/2313-4321/3/1/1: 26 pages.

Khwaldia et al.; "Biopolymer Coatings on Paper Packing Materials"; Published in vol. 9, 2010, on Dec. 21, 2009, in the Comprehensive Reviews in Food Science and Food Safety. Abstract, 2 pages, downloaded from https://ift.onlinelibrary.wiley.com/doi/10.1111/j.1541-4337.2009.00095.x on Apr. 18, 2022.

Su et al.; "Robust, high-barrier, and fully recyclable cellulose-based plastic replacement enabled by a dynamic imine polymer"; 10 pages; published in Journal of Materials Chemistry A; Jun. 25, 2020; downloaded Apr. 18, 2022 from file:///C:/Users/08421/Downloads/Robusthigh-barrierandfullyrecyclablecellulose-basedplasticreplacementenabledbyadynamiciminepolyme.pdf.

International Search Report and Written Opinion for International application No. PCT/US2023/014572; dated Jun. 5, 2023; 15 pages.

Fibre Box Association; "Voluntary Standard for Repulping and Recycling Corrugated Fiberboard Treated to Improve its Performance in the Presence of Water and Water Vapor." dated Aug. 16, 2013; 23 pages.

Su et al.; "Robust, high-barrier, and fully recyclable cellulose-based plastic replacement enabled by a dynamicimine polymer"; Journal of materials chemistry A 2020 v. 8 No. 28 pp. 14082-14090; Dated Jun. 24, 2020 (Abstract only provided; downloaded Jul. 5, 2023 from https://pubag.nal.usda.gov/catalog/7042864).

Khwaldia et al.; "Biopolymer Coatings on Paper Packaging Materials"; Comprehensive Reviews in Food Science and Food Safety, vol. 9, Issue 1, Jan. 2010 pp. 82-91; First Published Dec. 21, 2009; (Abstract only provided; downloaded Jul. 5, 2023 from https://ift.onlinelibrary.wiley.com/doi/abs/10.1111/j.1541-4337.2009.00095.x).

Kaiser et al.; "Recycling of Poylmer-Based Mutlilayer Packaging: A Review"; Recycling, vol. 3, No. 1, p. 1 Dec. 2017; (Abstract only provided; downloaded Jul. 5, 2023 from https://doaj.org/article/1341eb228bc042b982e11b16057f86ad).

International Search Report and Written Opinion for International App. No. PCT/US2023/036926; Dated Feb. 20, 2024, 14 pages.

* cited by examiner

RECYCLABLE PAPER WITH POLYMERIC BARRIER LAYER AND METHOD OF RECYCLING THE SAME

FIELD OF THE INVENTION

Embodiments of the present invention relate generally to paper products, and more particularly, to recyclable paper with a polymeric barrier wherein the barrier is separable from the paper, such that the paper is recyclable.

BACKGROUND

Flexible packaging structures are generally made from multiple polymeric components, often comprising layers of different polymeric films laminated together to achieve desired properties. The layered, laminated films provide desired barrier properties, however, are generally not recyclable in a standard recycling stream due to the multiple different polymers contained therein.

Similarly, existing paper packaging products may include some polymeric components or coatings to supply barrier properties similar to those of plastic film packages (i.e., moisture and oxygen barriers). In order for a polymer-coated paper product to be recyclable, the recycling process must return a minimum percentage of the fibers from the initial product, generally at least 80% total weight, or at least 85% total weight, based on bone dry fiber charge to the pulper. However, polymeric coatings applied to paper generally encapsulate the fibers of the paper during the manufacturing process to provide the desired barrier properties. During repulping/recycling, the fibers of the polymer-coated paper agglomerate. These coatings do not easily separate or remove themselves from the fibers during the recycling process and, therefore, polymer-coated paper packaging is often unable to be recycled.

Through ingenuity and hard work, the inventor has developed a recyclable paper having polymeric barrier properties, for use in packaging, a method for making the same, and a method for easily breaking down and separating the polymer components from the paper components, such that the product may be recyclable. Further, the recyclable paper may be manufactured and recycled with existing machinery.

BRIEF SUMMARY

In an embodiment, the invention comprises a paper packaging structure that delivers barrier properties comparable to a laminate film and is curbside recyclable. The present invention comprises a paper layer, a polymeric film layer, and an adhesive layer adhesively joining the paper layer and the polymeric film layer.

In an embodiment, the invention comprises a method of recycling the inventive paper packaging structure by repulping the paper fibers within the paper packaging structure.

In an embodiment the present invention is a recyclable structure for use in packaging comprising, a paper layer forming an exterior layer of the structure, a polymeric layer forming an interior layer of the structure, and an adhesive layer adhesively joining the paper layer and the polymeric layer. The adhesive layer has a greater affinity for the polymeric layer than the paper layer.

In some embodiments, the adhesive layer may be releasable from the paper layer upon repulping. In some embodiments, the polymeric layer may include a barrier layer. In some embodiments, the barrier layer may be aluminum oxide. In some embodiments, the barrier layer may be transparent. In some embodiments, the structure may further include a coating layer disposed adjacent either the polymeric layer or the barrier layer. In some embodiments, the coating layer may be a heat seal. The heat seal may be polyester, styrene acrylic, or styrene butadiene. In some embodiments, the coating layer may be a cold seal.

In some embodiments, the structure may be at least 90% paper by weight. In some embodiments, at least 80% by weight of the paper layer is recovered upon recycling of the structure. In some embodiments, the adhesive layer may have a thickness of less than 10 microns. In some embodiments, the paper layer may comprise a plurality of exposed fibers on an inner surface thereof. Further in some embodiments, the adhesive layer may be configured to prevent the polymeric layer or the barrier layer from binding with or encapsulating the plurality of exposed fibers. In some embodiments, the adhesive layer is transparent.

In another embodiment, a recyclable structure for use in packaging comprises a paper layer, a polymeric layer, a barrier layer disposed on the polymeric layer, and an adhesive layer adhesively joining the paper layer and the polymeric layer. The adhesive layer having an affinity of the polymeric layer. In some embodiments, the adhesive layer may be configured to fracture when introduced to mechanical stress. In some embodiments, the adhesive layer may be an acrylic or urethane based adhesive. In some embodiments, the barrier layer may be aluminum oxide.

In yet another embodiment a recyclable package comprises a laminate comprising at least 90% paper, by weight. The laminate comprises an external paper layer, a product-facing polymeric layer, and an acrylic or urethane adhesive layer adhesively joining the paper layer and the polymeric layer. The laminate is sealed about a product to form a package. In some embodiments, the recyclable package may comprise a gusset pouch or a flat pouch.

BRIEF DESCRIPTION OF THE SEVERAL VIEWS OF THE DRAWINGS

Figure 1:
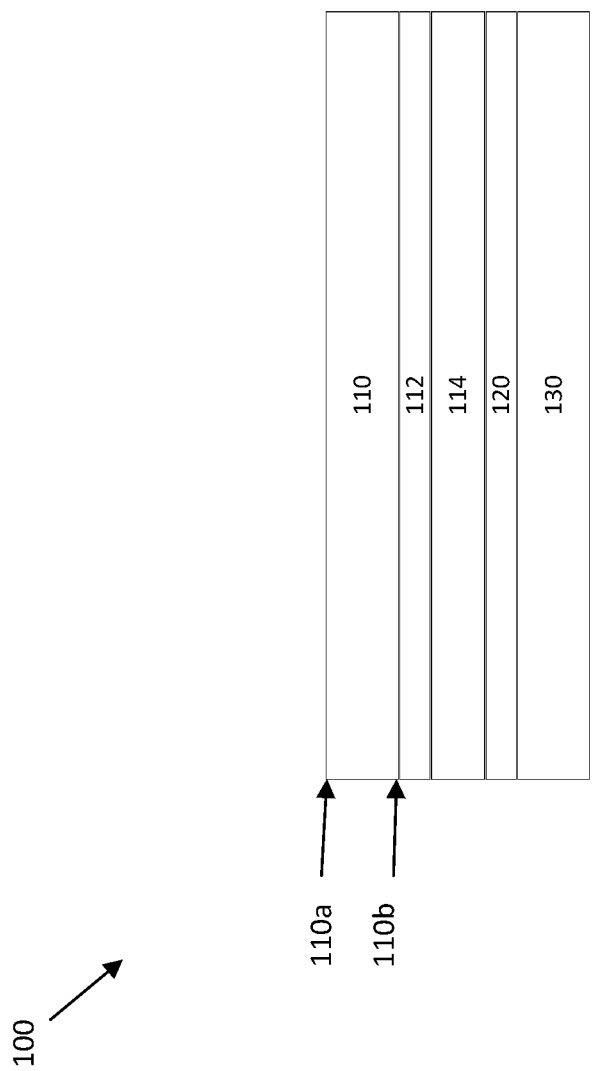
Figure 2:
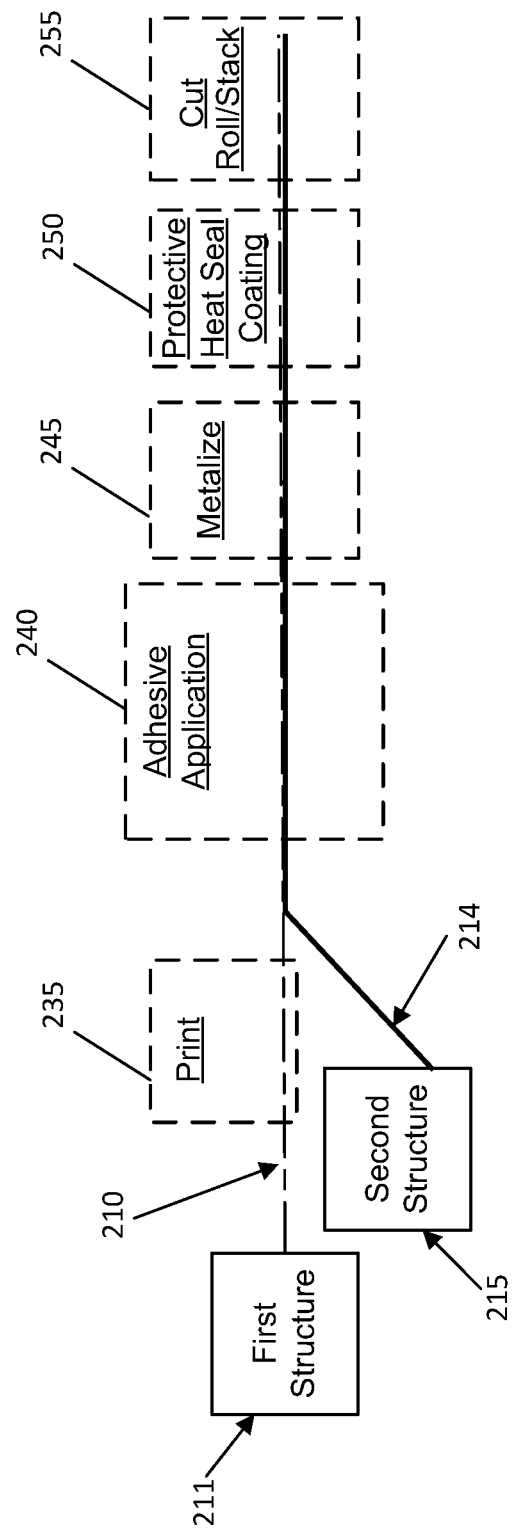
Figure 3:
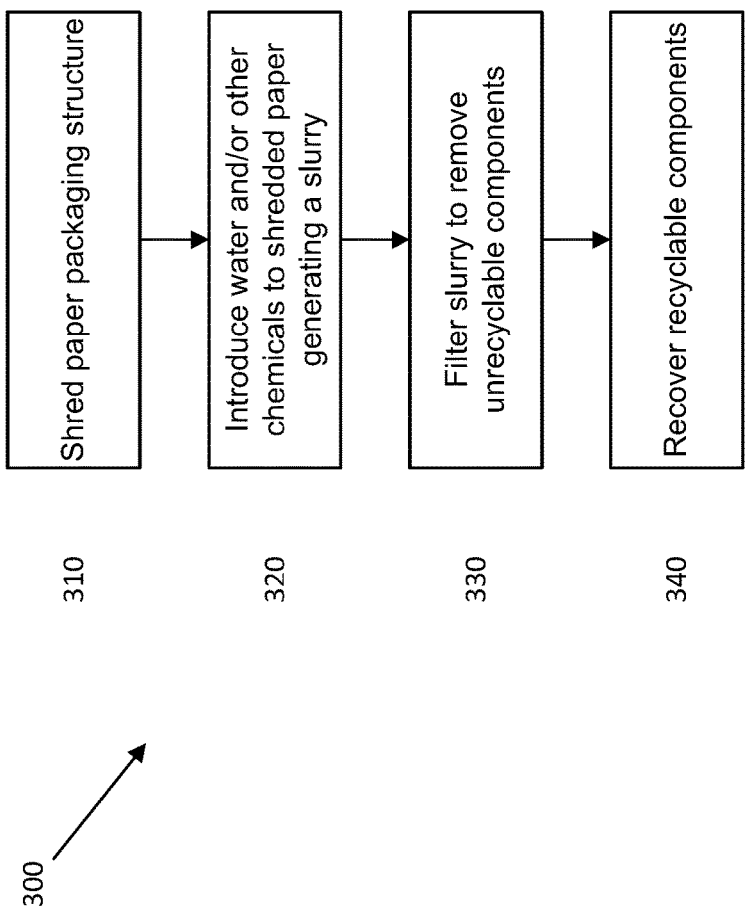

Having thus described the invention in general terms, reference will now be made to the accompanying drawings, which are not necessarily drawn to scale, and wherein:

FIG. 1 illustrates a cross-sectional view of an example paper packaging structure, in accordance with some embodiments discussed herein;

FIG. 2 illustrates a process diagram for forming an example paper packaging structure, in accordance with some embodiments discussed herein; and FIG. 3. Illustrates a flow chart of an example method for recycling an example paper packaging structure, in accordance with some embodiments discussed herein.

DETAILED DESCRIPTION

Example embodiments of the present invention now will be described more fully hereinafter with reference to the accompanying drawings, in which some, but not all embodiments of the invention are shown. Indeed, the invention may be embodied in many different forms and should not be construed as limited to the example embodiments set forth herein; rather, these embodiments are provided so that this disclosure will satisfy applicable legal requirements. Like reference numerals refer to like elements throughout.

A recyclable paper packaging structure is provided herein. Paper packaging products may require barrier properties to preserve the condition of the contents of the packaging, while maintaining the recyclability of the structure. In an embodiment a paper packaging structure is provided wherein a buffer layer (e.g., an adhesive) is positioned between a paper layer and a polymeric layer, thereby providing barrier properties, while preventing the polymeric layer from directly encapsulating the fibers within the paper layer, thereby maintaining the recyclability of the structure. In an embodiment, the polymeric layer is not coated onto, extruded onto, sprayed onto, or otherwise directly applied to the paper layer. In an embodiment, the polymeric layer is layered onto, coated onto, extruded onto, sprayed onto, or otherwise directly applied to the adhesive layer.

FIG. 1 illustrates an example paper packaging structure 100. In an embodiment, a paper layer 110 comprises the majority of the packaging structure 100, by weight. In some embodiments, the paper layer 110 may account for up to 70% total weight of the packaging structure 100, or in another embodiment up to 80% total weight of the packaging structure 100, or in still another embodiment more than 90% of the total weight of the packaging structure 100. In some embodiments, the paper layer 110 may account for between 85-95% of the total weight of the packaging structure 100.

In some embodiments, the paper layer 110 may comprise only virgin paper, while in other embodiments, the paper layer 110 may comprise only recycled paper (post-consumer or post-industrial). In some embodiments, the paper layer 110 may comprise a mix of recycled paper and virgin paper.

The paper layer 110 may define a first surface 110a and a second surface 110b. The first surface 110a may form the exterior of the structure (e.g., the exterior of the packaging 100) and the second surface 110b may bond with other structures. In some embodiments, the first surface 110a may be printed or may include an ink layer to provide labeling, graphics, logos, product information, or the like. The printed matter or ink layer may be printed using any known printing process.

In some embodiments, an adhesive layer 112 may join the second surface 110b of the paper layer 100, with a polymeric layer 114. In some embodiments, the polymeric layer 114 may include barrier properties, within the polymeric layer 114, while in other embodiments, the polymeric layer 114 may comprise additional barrier layers (e.g., metallization) on a surface opposite the adhesive layer 112.

In some embodiments, the adhesive layer 112 may be disposed adjacent the second surface 110b of the paper layer 110. The adhesive layer 112 may be applied in a solid layer (i.e., flood coated) across the entirety of the second surface 110b of the paper layer 110. In some embodiments, the adhesive layer 112 may be pattern applied, for example a series of dots or concurrent parallel lines, or similar. The adhesive layer 112 may be configured as a buffer to coat the second side 110b of the paper layer 110 without encapsulating the fibers forming the paper layer 110.

In some embodiments, the adhesive layer 112 may be applied to the polymeric layer 114. In some embodiments, the adhesive layer 112 may be flood coated onto the polymeric layer 114. In some embodiments, the adhesive layer 112 is applied to the polymeric layer 114 before application to the paper layer 110

In some embodiments, the adhesive layer 112 may be clear adhesive. In some embodiments, the adhesive may have a greater affinity for a polymeric layer 114, than the paper layer 110. For example, the polymeric layer 114 may include a surface treatment (e.g., a corona or flame treatment) which may help retain the adhesive on the adhesive layer 112. In some embodiments, the adhesive layer 112 may not be hydrophilic (e.g., will not dissolve in water), and may be at least partially removed from the paper fibers mechanically during the recycling process. In an embodiment, the adhesive layer 112 is re-pulpable and/or releasable from the paper layer 110.

In some embodiments, the adhesive layer 112 may comprise a low or medium performance adhesive. In some embodiments, the adhesive layer 112 may comprise an acrylic. In some embodiments, the adhesive layer 112 may be solvent based or water based. In some embodiments, the acrylic may be a water emulsion, wherein the emulsion may fracture when exposed to mechanical stresses, for example in the repulping process. In an embodiment, the adhesive may fracture internally such that a portion of the adhesive layer 120 remains adhered to the polymeric layer 114, and a second portion of the adhesive layer 120 remains adhered to the paper layer 110. In other embodiments, all or more of the adhesive layer 120 remains adhered to the polymeric layer 114 upon exposure to mechanical stress, such as a pulping or recycling process. In some embodiments, the first portion and the second portion of the adhesive layer are equal, while in other embodiments, the first portion may be larger than the second portion. In some embodiments, the adhesive may fracture along the junction between the adhesive layer 120 and the paper layer 110, while in other embodiments, the adhesive layer 120 may fracture along the juncture with the polymeric layer 114.

In some embodiments, the adhesive layer may be urethane based. In some embodiments, a high-performance adhesive may be used within the adhesive layer 112. In an embodiment, the adhesive layer 112 may comprise a two-component urethane.

In some embodiments, the adhesive layer 112 may be heat activated. In some embodiments, the adhesive layer 112 may be applied to either the polymeric layer 114 or the paper layer 110 as a heat seal coating. The polymeric layer 114 and/or paper layer 110 may be advanced under a heat and pressure nip to form a laminate sealed by the heat.

In some embodiments, the adhesive may be selected based on the affinity for the polymeric layer 114, and/or lack of affinity for the paper fibers. The adhesive may be chosen based on the composition of the polymeric layer 114 and surface treatments may be respectively applied thereto.

Not wanting to be bound by theory it is believed the adhesive may be dissolvable. In some embodiments, a portion of the adhesive layer may fracture loose from the paper, while some adhesive may remain adhered to the paper fibers. In some embodiments, the adhesive may be solubilized.

In some embodiments, the polymeric layer 114 may be affixed to the paper layer 110 via the adhesive layer 112. The adhesive layer 112 may be configured as a buffer layer between the polymeric layer and the paper fibers of the paper layer 110, meaning that the adhesive layer 112 may prevent the polymeric layer 114 from encapsulating the fibers of the paper layer 110. In some embodiments, the adhesive layer 112 may have an affinity for the polymeric layer 114, rather than the paper layer 110.

In some embodiments, the polymeric layer 114 may be a pre-formed sheet, web, or roll. In some embodiments, the polymeric layer 114 may be high density polyethylene (HDPE), polyethylene (PE), polyethylene terephthalate (PET), polypropylene (PP) or other polymeric films. The polymeric layer 114 may be made from a single polymer, (e.g., HDPE or PET) or in some embodiments, the polymeric layer 114 may be made from a blend of polymers or various layers of polymers. The polymeric layer 114 may be chosen based on the desired properties for the final product, in an embodiment. For example, a polyethylene film may be used if the package will hold dry goods due to the moisture barrier properties, or a polyethylene terephthalate film may be used if the package will hold packaged goods which require oxygen barrier properties. In some embodiments, the polymeric layer 114 may include a metalized layer within the polymeric layer 114. The metalized layer within the polymeric layer 114 may increase barrier properties of the polymeric layer 114.

In some embodiments, the polymeric layer 114 may provide a barrier for migratory components between the product and the paper layer 110. In some embodiments, the polymeric layer 114 may prevent any grease, mineral oil or similar from transferring from the product to the paper layer 110, thereby preventing grease stains or creases within the paper layer 110.

In some embodiments, the packaging structure 100 may be used as a container for dry products including seasoning, mixes, cookies, crackers, nuts and the like. In some embodiments, the polymeric layer 114 may comprise the product facing side of a food package, and the paper layer 110 may be the outer or exterior layer. In some embodiments, the polymeric layer 114 may further act as a barrier between the ink contained in or on the paper layer 110 and the product.

In some embodiments, the polymeric layer 114 may define a polymeric layer thickness of less than 10 microns, in some embodiments less than 8 microns and in some embodiments less than 6 microns. The polymeric layer 114 thickness may be correlated to the thickness of the paper layer 110. For example, to recover the desired amount of paper fibers, a thicker polymeric layer 114, may require a thicker paper layer 110 to produce the desired amount of paper fibers. Further, a thinner polymeric layer 114, may allow a thinner paper layer 110 as there is less of the polymeric layer 114 to separate out in the recycling process and therefore may yield a higher percentage recovery of the paper fibers within the paper layer 110. In some embodiments, the polymeric layer 114 may be a transparent film, thereby reducing the appearance of imperfections within the recycled paper fibers upon repulping.

In some embodiments, the polymeric layer 114 may be metalized to improve barrier properties. In an embodiment a barrier layer 120 (e.g., a metal foil layer) is applied to the polymeric layer 114. In an embodiment, the barrier layer 120 and/or the metalized layer will be de minimis, and able to be removed from the packaging structure with the polymeric layer 114. In this embodiment, the barrier layer 120 and/or the metalized layer should not contaminate the paper layer 110 upon repulping. In some embodiments, the polymeric layer 114 may be metalized on the surface between the adhesive layer 112 and the polymeric layer 114, while in other embodiments, the barrier layer 120 may be disposed on the surface of the polymeric layer 114 opposite the adhesive layer 112, and optionally between the polymeric layer 114, and a heat seal layer 130.

In some embodiments, the polymeric layer 114 may comprise any of various polymer-based barrier materials including barrier polymer films such as ethylene vinyl alcohol copolymer (EVOH), polyvinyl alcohol (PVOH), polyamide, and the like; metallized polyolefin films such as polyethylene, polypropylene, oriented polypropylene, and the like; AlOx-coated polymer films; SiOx-coated polymer films; metal foil such as aluminum foil; and others.

In an embodiment, the polymeric layer 114 may comprise metallized polyethylene terephthalate (PET), metallized oriented polypropylene (OPP), aluminum oxide (ALOX) PET, ALOX OPP, or silicon-oxide (SiOX) PET. In some embodiments, the polymeric layer 114 may be a metalized biaxially-oriented polyethylene terephthalate, for example, Mylar® manufactured by DuPont Teijin Films. In some embodiments, the barrier layer 120 may be AlOx, SiOx or another similar metal.

In some embodiments, the metalized portion or the polymeric layer 114 or the barrier layer 120 may be brittle. To prevent damage to the layer an optional protective heat seal coating 130 may be applied to the metal layer 120. The heat seal coating 130 may be a polyester layer, a styrene acrylic layer or a layer of styrene butadiene. In some embodiments, these coatings may be used to protect the AlOx layer or other barrier layer of the polymeric layer 114.

Method of Manufacture

In the method of manufacture, referring to FIG. 2, a paper layer 210 may be advanced from a first structure supply roll 211. One or both surfaces of the paper layer 210 may be optionally treated with a corona discharge or a flame treatment to render the surface more receptive to inks and/or more readily bondable to the pressure sensitive adhesive that is subsequently applied to the surface. The paper layer 210 may be optionally pre-printed as a part of the presently described manufacturing process. While in some embodiments, the paper layer 210 may be advanced to a printing station 235 during manufacture. The inks and printing may be applied to the first side 110a (i.e., exterior surface) of the paper layer 110 in an embodiment.

In an embodiment, a second structure 214, optionally the polymeric layer, may be advanced from a supply roll 215. One or both surfaces of the second structure 214 may be optionally treated by corona discharge or a flame treatment. The second structure 214 may be coextensive with the paper layer 210 (i.e., the width of the second structure 214 may be substantially equal to the width of the paper layer 210 and the longitudinal edges of the second structure 214 may coincide with the longitudinal edge of the paper layer 210). As used herein, the longitudinal edges of the paper layer 210, and second structure 214, refer to the edges which extend in the machine direction of the packaging structure 100, perpendicular to the edge of the packaging structure wherein the roll is initiated from supply rolls 211, 215. In an embodiment, the paper layer 210 comprises the exterior surface of the resulting packaging structure 100.

In some embodiments, the second structure 214 may include the polymeric layer 114, the metalized layer 120 and the protective heat seal coating 130. While in other embodiments, the polymeric layer 114 may be metalized and coated with the protective heat seal coating 130 after being adhered to the first structure, in a metalizing step 245, and/or a coating step 250.

In an embodiment, an adhesive is applied to the paper structure 210 and/or the polymeric layer 214. In an embodiment, the adhesive is flood coated (100% coverage) onto the surface of the relevant structure. In an embodiment, the adhesive is patterned onto the surface of the relevant structure. The adhesive may be a permanent adhesive applied to the paper layer 110 to coat the paper fibers within the paper layer, but not encapsulate the paper fibers. In some embodiments, the coating of the adhesive layer 112 may provide a buffer between the paper layer 110 and the polymeric layer 114, as the polymeric layer 114, may encapsulate the paper fibers, thereby preventing recycling of the packaging structure 100, as the recovery of the paper fibers may be inadequate.

In an embodiment, the adhesive layer 112 may remain adhered to the paper fibers during the recycling process, the adhesive layer 112 may be made from a clear adhesive, so as to not affect the color test during the recycling process.

In an embodiment, the adhesive layer 112 has a greater affinity for the polymeric layer 114 than the paper layer 110. As such, although a portion of the adhesive layer 112 may remain on the paper fibers during the repulping and recycling process, the majority of the adhesive layer will separate from the paper.

In some embodiments, the adhesive within the adhesive layer 112 may be dissolvable. The adhesive may separate from both the polymeric layer 114 and the paper layer 110 in the repulping process. In an embodiment, the paper packaging structure may be cut and stacked, and/or rolled to be transported to a separate facility for packaging, at station 255.

In some embodiments, the paper packaging structure 100 may be formed into a flexible container. The flexible container may be in the form of a stand up pouch, gusseted pouch, pillow pouch, flat pouch, flow wrap, slug wrapper, bar wrapper, or similarly known packaging structure known in the art. The container may be formed such that the paper layer 110 of the paper packaging structure 100 is formed as the external surface of the container, while the polymeric layer 114 may be product facing. In some embodiments, the container may be a single serving container, while in other embodiments, the container may be a multi serving container.

Recyclability

The paper packaging structure may be easily recycled in the normal stream according to the recycling standards set forth in "Voluntary standard for Repulping and Recycling Corrugated Fiberboard Treated to Improve its Performance in the Presence of Water and Water Vapor, which is incorporated herein in its entirety. After use, a user may place the paper packaging structure in the normal recycling, (i.e., curbside). The paper packaging structure is then subjected to a standard recycling process, illustrated in FIG. 3, wherein the paper packaging structure 300 is shredded at operation 310. At operation 320 the shredded paper is exposed to water and other chemicals and repulped. The shredded paper may be homogenized to separate out polymeric flakes. At operation 330 the repulping slurry is filtered through a screen where the unrecyclable components (e.g., the polymeric layer, metalized layer, adhesive layer, and protective seal, optionally in flake form), are removed, as the components may be larger than the sieve size in the filter. At operation 340, the remaining recyclable products (e.g., the paper fibers) are recovered. In some embodiments, the slurry may be placed in an oven over night to dry the paper fibers. In some embodiments, the paper packaging structure is able to recover at least 75% of the original paper fibers, at least 80% of the original paper fibers, or at least 85% of the original paper fibers from the paper layer.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

That which is claimed:

1. A recyclable structure for use in packaging, the structure comprising:
   a paper layer forming an exterior layer of the structure;
   a polymeric layer forming an interior layer of the structure;
   an adhesive layer adhesively joining the paper layer and the polymeric layer, wherein the adhesive layer has a greater affinity for the polymeric layer than the paper layer such that when exposed to mechanical stress the adhesive layer fractures internally into at least a first portion adjacent the paper layer and a second portion adjacent the polymeric layer and wherein, in a cross-section of the layers, the first portion is smaller than the second portion.

2. The structure of claim 1, wherein the adhesive layer is releasable from the paper layer upon repulping.

3. The structure of claim 1, wherein the polymeric layer includes a barrier layer.

4. The structure of claim 3, wherein the barrier layer is aluminum oxide.

5. The structure of claim 3, wherein the barrier layer is transparent.

6. The structure of claim 3, further comprising a coating layer disposed adjacent either the polymeric layer or the barrier layer.

7. The structure of claim 6, wherein the coating layer is a heat seal.

8. The structure of claim 7, wherein the heat seal is polyester, styrene acrylic, or styrene butadiene.

9. The structure of claim 6, wherein the coating layer is a cold seal.

10. The structure of claim 3, wherein paper layer comprises a plurality of exposed fibers on an inner surface thereof, and wherein the adhesive layer is configured to prevent the polymeric layer or the barrier layer from binding with or encapsulating the plurality of exposed fibers.

11. The structure of claim 1, wherein the structure is at least 90% paper by weight.

12. The structure of claim 1, wherein at least 80% by weight of the paper layer is recovered upon recycling of the structure.

13. The structure of claim 1, wherein the adhesive layer has a thickness of less than 10 microns.

14. The structure of claim 13, wherein the adhesive layer has a thickness of less than 6 microns.

15. The structure of claim 1, wherein the adhesive layer is transparent.

16. A recyclable structure for use in packaging, the structure comprising:
   a paper layer defining a first surface and a second surface;
   an adhesive layer disposed adjacent the second surface;
   a polymeric layer disposed adjacent the adhesive layer, opposite the paper layer, wherein the adhesive layer has an affinity for the polymeric layer, such that when exposed to mechanical stress the adhesive layer fractures internally into at least a first portion adjacent the paper layer and a second portion adjacent the polymeric layer and wherein, in a cross-section of the layers, the first portion is smaller than the second portion; and a barrier layer disposed on the polymeric layer.

17. The structure of claim 16, wherein the adhesive layer is an acrylic or urethane based adhesive.

18. The structure of claim 16, wherein the barrier layer is aluminum oxide.

* * * * *